United States Patent
Feng et al.

(10) Patent No.: US 7,409,123 B1
(45) Date of Patent: Aug. 5, 2008

(54) GRATING HAVING REDUCED MODE DISPERSION

(75) Inventors: Dazeng Feng, Arcadia, CA (US); Mehdi Asghari, San Marino, CA (US); Bradley Jonathan Luff, San Marino, CA (US)

(73) Assignee: Kotura, Inc., Monterey Park, CA (US)

( * ) Notice: Subject to any disclaimer, the term of this patent is extended or adjusted under 35 U.S.C. 154(b) by 0 days.

(21) Appl. No.: 11/807,219

(22) Filed: May 24, 2007

(51) Int. Cl.
*G02B 6/34* (2006.01)
*G02B 6/26* (2006.01)

(52) U.S. Cl. .............................. 385/37; 385/14; 385/24; 385/27; 385/39

(58) Field of Classification Search .................. 385/14, 385/24, 27, 31, 37, 39
See application file for complete search history.

(56) References Cited

U.S. PATENT DOCUMENTS 7,248,755 B2 * 7/2007 Sappey et al. .................. 385/13

OTHER PUBLICATIONS

Densmore, A., "DWDM data receiver based on monolithic integration of an Echelle grating demultiplexer and waveguide photodiodes," Electronics Letter, vol. 41, No. 13 (2005).
Doi, Y. et al, "Flat and high responsivity CWDM photoreceiver using silica-based AWG with multimode output waveguide," Electronic Letters, vol. 39, No. 22 (2003).
Janz, S., "Planar waveguide Echelle gratings in silica-on-silicon," IEEE Photonics technology letters, vol. 16, No. 12, 503-505(2004).
McGreer, K.A., "Diffraction from concave gratings in planar waveguides," IEEE Photonics technology letters, vol. 7, No. 3, 324-326(1995).
Zhimin Shi, "A Hybrid diffraction method for design of etched diffraction grating demultiplexers," J. Lightwave Technology, vol. 23, No. 3, 1426-1434 (2005).

* cited by examiner

*Primary Examiner*—Frank G Font
*Assistant Examiner*—Michael P Mooney
(74) *Attorney, Agent, or Firm*—Gavrilovich, Dodd & Lindsey, LLP (57) ABSTRACT

An optical device includes an echelle grating and input waveguide arranged such that the echelle grating receives an input signal that exits from a port of the input waveguide. The echelle grating is configured to reflect the input signal such that when the input signal has a plurality of channels, the input signal separates into output signals that each includes a different one of the channels. The device also includes a plurality of output waveguides that each includes a port positioned to receive one of the output signals. The output waveguides include central waveguides. The central waveguides are the three centermost output waveguides when the total number of output waveguides is odd and the two centermost output waveguides when the total number of output waveguides is even. The central waveguides are positioned such that the grating axis passes through the port associated with one of the central waveguides or passes between the ports associated with the central waveguides.

21 Claims, 7 Drawing Sheets

GRATING HAVING REDUCED MODE DISPERSION

FIELD

The present invention relates to optical devices and more particularly to devices having an optical grating.

BACKGROUND

A variety of optical devices make use of optical gratings such as Echelle gratings. In addition to the gratings, these devices typically include an input waveguide and a plurality of output waveguides. During operation of the device, a multi-channel light signal travels from the input waveguide to the grating and is reflected off the grating toward the output waveguides. The reflected light signal separates into output signals that each carries one of the channels. Each of the output waveguides is positioned to receive one of the output signals. Accordingly, each output waveguide is associated with a particular one of the output signals.

The reflection of the light signals off of a grating with non-ideal facet verticality excites higher order modes that disperse as they travel from the grating to the output waveguides. The dispersion of these higher order modes can cause a portion of the light from one of the output signals to be received at an output waveguide that is not associated with that output signal. Accordingly, the dispersion can be a source of cross talk and loss at the output waveguides. One method of dealing with this dispersion has been to improve the verticality of grating facet or make the device support only a single mode. However, the vertically of grating facet is limited by fabrication capability and single mode devices are often not desirable especially for Silicon on Insulator (SOI) waveguide.

Accordingly, there is a need for an optical device that includes an optical grating with reduced mode dispersion.

SUMMARY

An optical device includes an echelle grating and input waveguide arranged such that the echelle grating receives an input signal that exits from a port of the input waveguide. The echelle grating is configured to reflect the input signal such that when the input signal has a plurality of channels, the input signal separates into output signals that each includes a different one of the channels. The device also includes a plurality of output waveguides that each includes a port positioned to receive one of the output signals. The output waveguides include central waveguides. The central waveguides are the three centermost output waveguides when the total number of output waveguides is odd and the two centermost output waveguides when the total number of output waveguides is even. The central waveguides are positioned such that the grating axis passes through the port associated with one of the central waveguides or passes between the ports associated with the central waveguides.

Another embodiment of the device includes an echelle grating configured to operate on a particular selection of channels. The selection of channels includes central channels. The central channels are the three centermost channels when the total number of channels is odd and being the two centermost channels when the total number of channels is even. The device includes input waveguide arranged such that the echelle grating is configured to receive an input light signal from the input waveguide. The input signal can include the selection of channels. The echelle grating is configured to reflect the input signal such that different wavelengths travel away from the echelle grating in different directions. Additionally, the input waveguide and the echelle grating are arranged such that a central wavelength travels away from the echelle grating in a direction that is parallel to an axis of the echelle grating. The central wavelength is a wavelength in a range extending between the wavelengths of the outermost of the central channels.

Methods of making optical devices are also disclosed.

BRIEF DESCRIPTION OF THE FIGURES

FIG. 6A through FIG. 6C illustrate an optical device construction suitable for use with the optical device of FIG. 4 or FIG. 5.

DESCRIPTION

An optical device includes an input waveguide, an optical grating such as an echelle grating, and a plurality of output waveguides. During operation of the device, a multi-channel light signal travels from the input waveguide to the grating and is reflected off the grating toward the output waveguides. The reflected light signal separates into output signals that each carries one of the channels.

Each of the channels is associated with a different wavelength. As a result, the selection of channels covers a range of wavelengths. The device is configured such that a central wavelength that is central to the range of wavelengths covered by the channels travels away from the grating in a direction that is substantially parallel to the axis of the grating. The amount of mode dispersion experienced by an output signal decreases as the direction of the output signal becomes more parallel with the grating axis. By designing the device so a central wavelength is parallel to the grating axis, the mode dispersion in each of the output channels is reduced. As a result, the device is associated with a reduced level of mode dispersion.

Figure 1A:
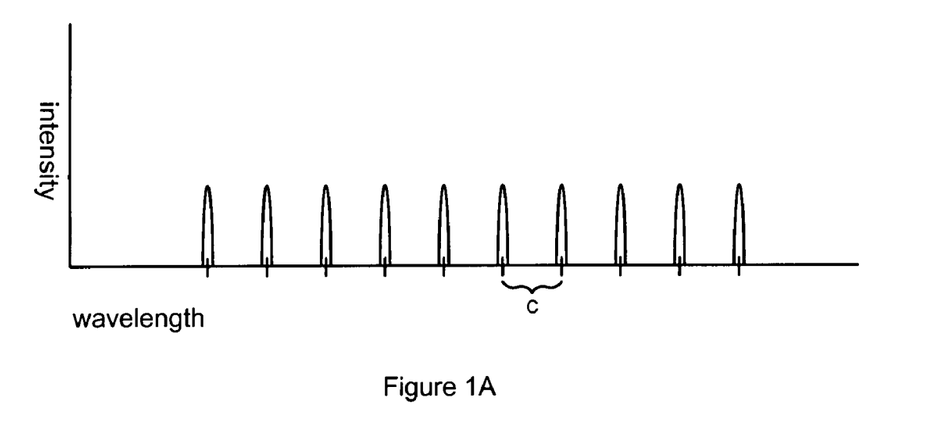
FIG. 1A illustrates a selection of optical channels having an even number of channels.

The optical device includes an optical grating such as an echelle grating. An optical grating separates an input light signal having a plurality of channels into output signals that each include one of the channels. For instance, FIG. 1A illustrates the intensity versus wavelength profile for a suitable input signal. The illustrated profile includes ten channels. Each channel is associated with a particular wavelength that is illustrated by a vertical line through the x-axis of the profile. Although each channel is associated with a particular wavelength, each channel can include a range of wavelengths as is evident from the profile shown in FIG. 1A. The output signals can each include one of the channels illustrated in FIG. 1A.

The selection of channels includes central channels. For instance, when the total number of channels in the selection of channels is even, the center two channels serves as the central channels. As an example, if the selection of channels includes N sequentially numbered channels and N is an even number, the two central channels are channel number (N/2) and (N/2)+1. The selection of channels is also associated with central wavelengths. The central wavelengths are the wavelengths in the range extending from one of the center channels to the other center channels. The selection of channels is also associated with a middle wavelength. The middle wavelength is the average of the wavelength for the channel with the longest wavelength and the channel with the shortest wavelength.

Figure 1B:
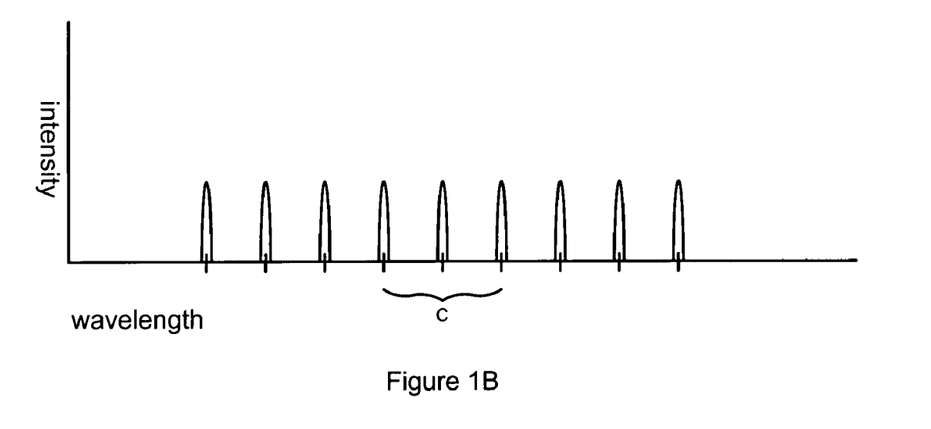
FIG. 1B illustrates a selection of optical channels having an odd number of channels.

A device having an optical grating can be configured to operate with an even number of channels such as the ten channels illustrated in FIG. 1A or a grating can be configured to operate with an odd number of channel such as the nine channels illustrated in FIG. 1B. When the total number of channels is odd, the selection of channels include central channels. For instance, when the total number of channels in the selection of channels is odd, the center three channels serves as the central channels. The central channels include a centermost channel and two outermost channels. As an example, if the selection of channels includes N sequentially numbered channels and N is an odd number, the two outermost channels are the channel numbers (N−1)/2 and (N+3)/2 and the centermost channel is channel number (N+1)/2. The selection of channels is also associated with central wavelengths. The central wavelengths are the wavelengths in the range extending from one of the outermost channels to the other outermost channel. The selection of channels is also associated with a middle wavelength. The middle wavelength is the average of the wavelength for the channel with the longest wavelength and the channel with the shortest wavelength.

In some instances, the wavelength difference between adjacent channels in the selection of channels is constant. An example selection of channels includes or consists of channels at 1430 nm, 1450 nm, 1470 nm, 1490 nm, 1510 nm, 1530 nm, 1550 nm, 1570 nm 1590 nm, and 1610 nm. Another example selection of channels includes or consists of channels at 1490 nm and 1555 nm.

Figure 2:
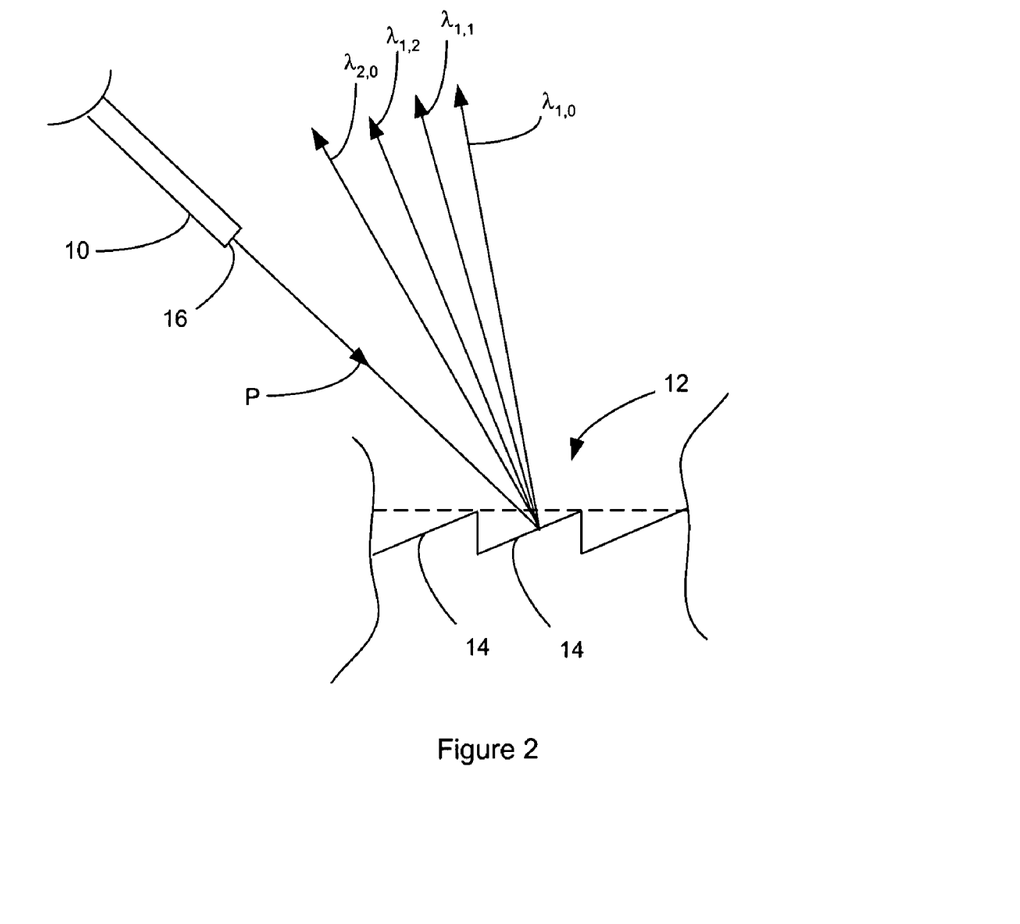
FIG. 2 illustrates the relationship between an input waveguide and an optical grating. The grating includes a plurality of grooves cut into a face of the grating.

FIG. 2 illustrates the relationship between an input waveguide 10 and an optical grating 12 that is employed in an optical device. The grating 12 includes a plurality of grooves 14 cut into a face of the grating 12 illustrated by the dashed line across the tops of the grooves. The surfaces that define the grooves 14 reflect light signals from the input waveguide 10. A suitable grating includes an echelle grating.

An input light signal labeled P travels through a port 16 of the input waveguide 10 and is received at the grating 12. As noted above, the input light signal includes a selection of channels. The input light signal is reflected off the grating 12. The grooves 14 in the grating are configured such that the different wavelengths travel away from the grating in different directions. Accordingly, the channels travel away from the grating in different directions. For instance, FIG. 2 illustrates the direction of propagation for wavelengths at $\lambda_{i,m}$ where the subscript i represents the channel number and the subscript m represents a different mode. Accordingly, $\lambda_{1,0}$ and $\lambda_{2,0}$ represent the fundamental mode of channel 1 and channel 2. As is evident from FIG. 2, the grating is configured such that the fundamental mode of different channels travel away from the grating in different directions. As a result, the grating 12 is configured to separate the input light signal into output light signals that include a different one of the channels.

As is also shown in FIG. 2, optical gratings can also cause different modes of the same channel to travel in different directions. For instance, FIG. 2 shows $\lambda_{1,0}$ and $\lambda_{1,1}$ traveling in different directions.

Figure 3:
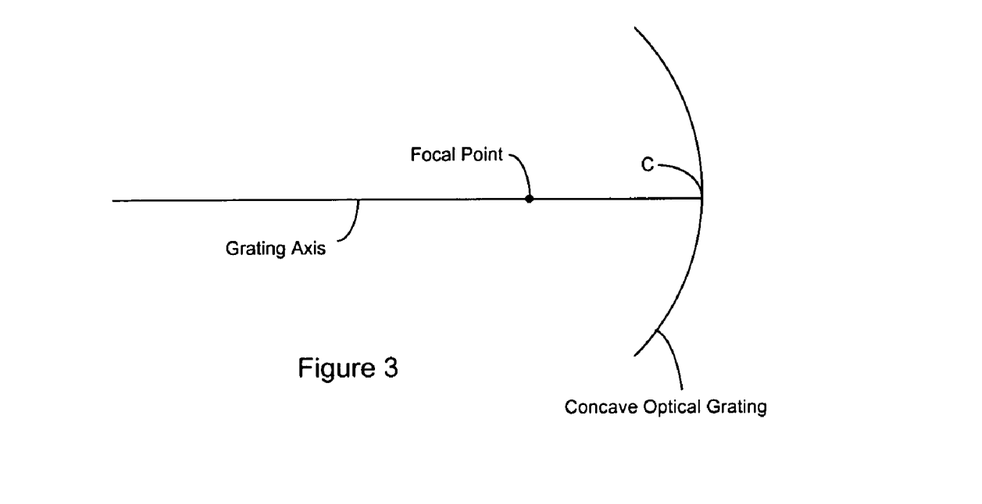
FIG. 3 illustrates a convex optical grating having a grating axis and a focal point.

Although FIG. 2 illustrates a flat optical grating, the optical grating can be a convex grating 12 as shown in FIG. 3. FIG. 3 shows the face of the grating but does not show the individual grooves in the face of the grating. The grating that has a focal point and a grating axis. The grating axis is normal to the face of the grating and extends through the focal point. The grating has an intersection point where the axis intersects the face of the grating. The intersection point is labeled C in FIG. 3. When the grating is flat grating, any of the grating normals can serve as the grating axis.

The optical device is configured to reduce the mode dispersion in the output light signals. The mode dispersion in an output signal decreases as the direction that the output signal travels away from the grating approaches the axis of the grating. Accordingly, the device is constructed such that a wavelength in the central wavelengths travels away from the grating in a direction that is substantially parallel to the grating axis. In some instances, the device is constructed such that the middle wavelength travels away from the grating in a direction that is substantially parallel to the grating axis.

One example of the device has an even number of output waveguides and is accordingly configured to operate with an even number of channels. Each of the output waveguides has a port through which an output signal traveling away from the grating enters the output waveguide. Because the device has an even number of output waveguides, the two center output waveguides receive the central channels and accordingly serve as central waveguides. For instance, if the device include N sequentially numbered output waveguides, the two central waveguides are output waveguide number (N/2) and (N/2)+1. The device can be constructed so the axis extends through a port of one of the two central waveguides. Alternately, the axis extends between the ports of the two central waveguides. For instance, the device can be configured so the middle wavelength is parallel to the axis but is between the central channels. As a result, the ports for the central waveguides would straddle the grating axis.

Figure 4:
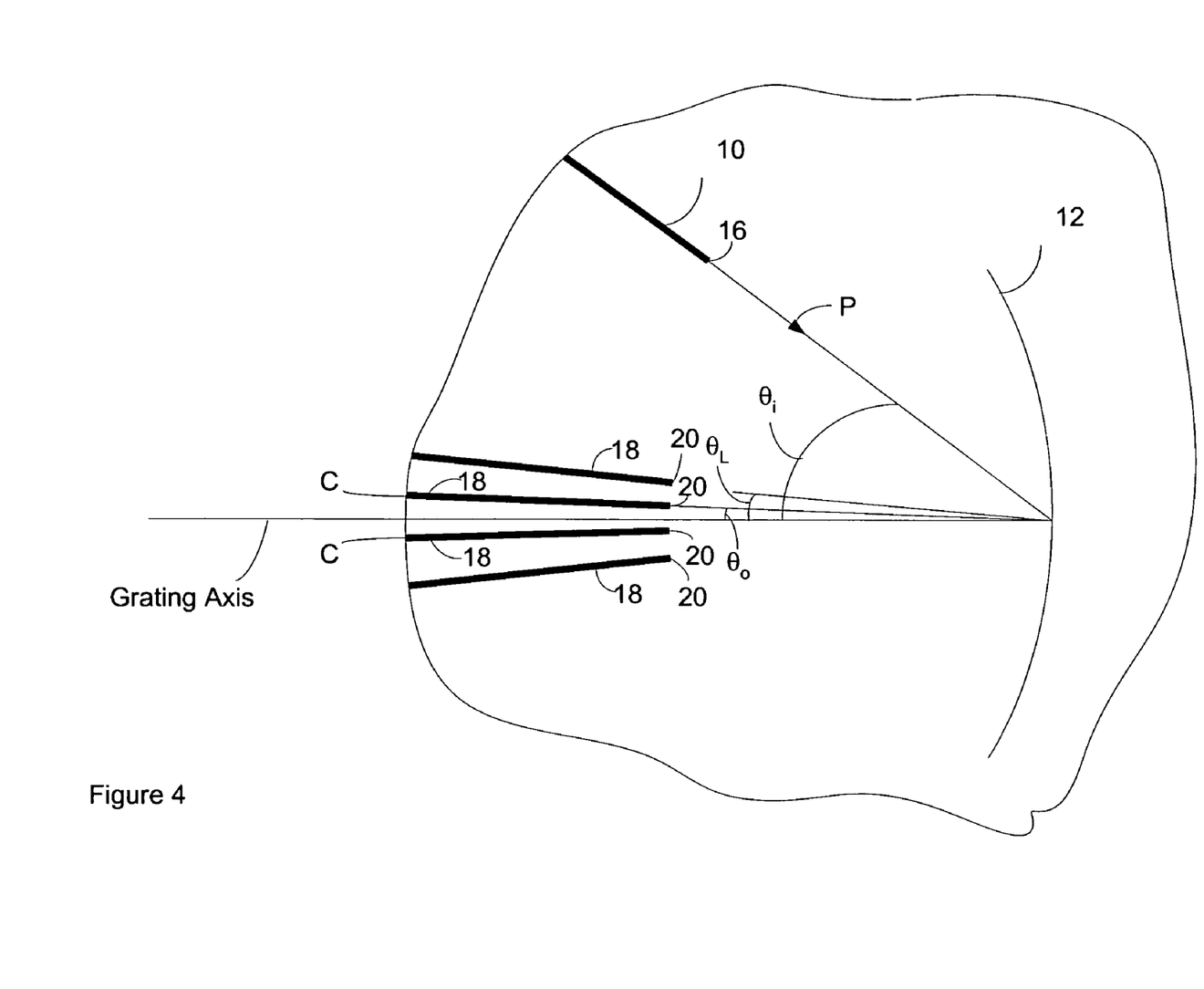
FIG. 4 illustrates a portion of an optical device having an input waveguide, an optical grating and an even number of output waveguides.

FIG. 4 illustrates an example of the optical device having an even number of output waveguides 18. The device includes an input waveguide 10. An input light signal labeled P exits through a port 16 of the input waveguide 10 and is incident on the grating 12 at an incident angle $\theta_i$. The grating 12 is configured to separate the input light signal into four output signals that each carries a different channel. The output signals are each received at one of four output waveguides 18. Because the direction that the output signals travel away from the grating is determine by the wavelength of the output signals, the position of the output waveguides is specific to a particular selection of channels. For instance, the position of the output waveguides relative to the grating and input waveguides determines the selection of channels for which the device will operate. The four output waveguides 18 include two central waveguides that are each labeled C. The ports 20 of the central output waveguide 18 straddle the grating axis in that the ports of the central output waveguides 18 are positioned on opposing sides of the grating axis.

FIG. 4 shows a line extending from the intersection point through the center of the port 20 of the central waveguide that is closest to the grating axis. The line has an angle $\theta_o$ relative to the grating axis. The device can be constructed such that $\theta_o$ is less than a limit angle $\theta_L$. Suitable limit angles, $\theta_L$, include angles less than 0.01°, 0.1° or 1°.

Another example of the device has an odd number of output waveguides and is accordingly configured to operate with an odd number of channels. Because the device has an odd number of output waveguides, the three center output waveguide receive the central channels and accordingly serve as central waveguides. The central waveguides include a centermost waveguide and two outermost waveguides. For instance, if the device include N sequentially numbered output waveguides, the two outermost waveguides are output waveguide numbers (N−1)/2 and (N+3)/2 and the centermost waveguide is output waveguide numbers (N+1)/2. The device can be constructed so the axis extends through a port 20 of any one of the three central waveguides. Alternately, the axis can extend between ports the central waveguides. In one embodiment, the device is constructed so the axis extends through the port 20 of the centermost of the central waveguides or extends between ports the central waveguides. In a preferred example, the axis extends through the port 20 of the centermost of the central waveguides.

Figure 5:
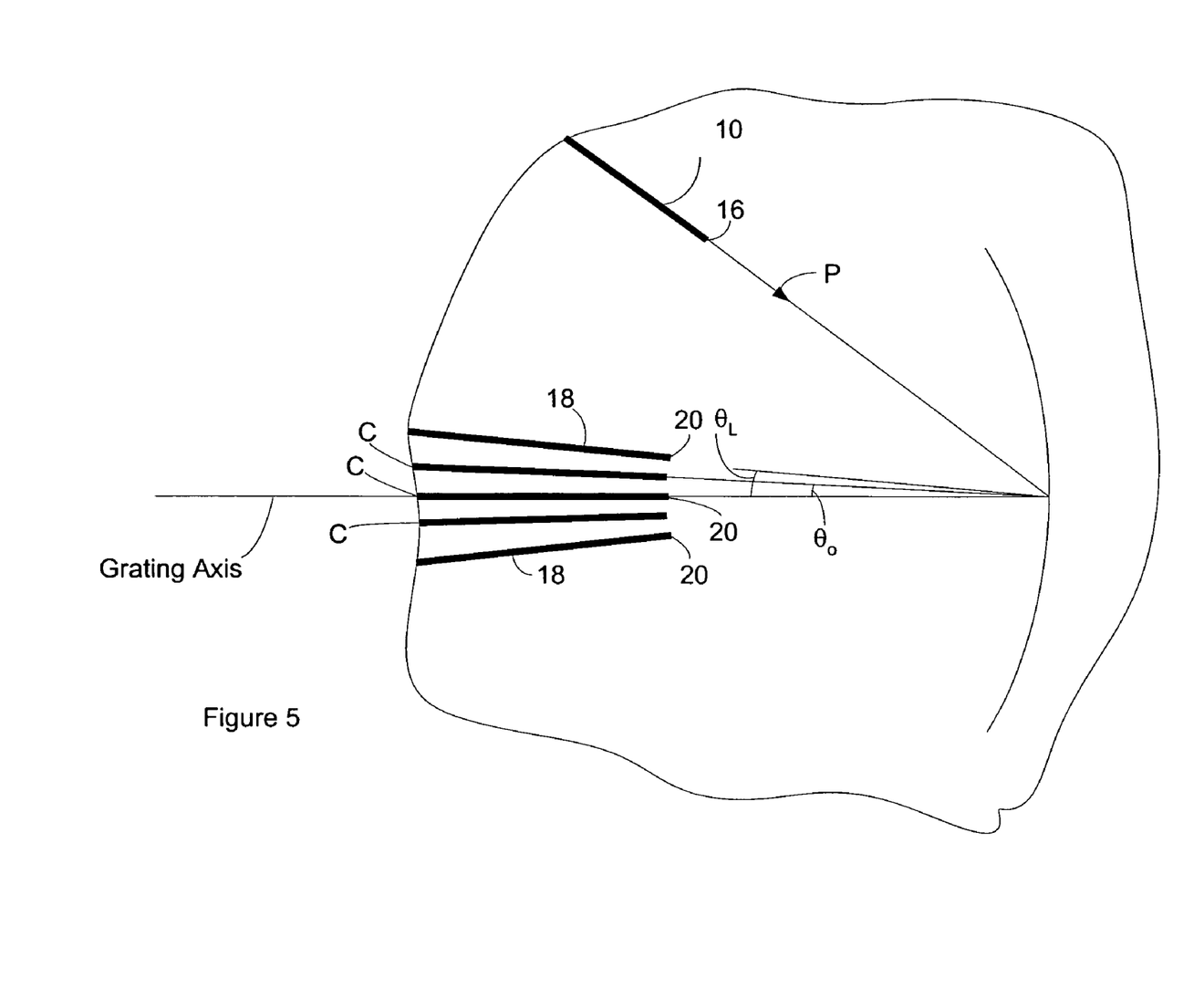
FIG. 5 illustrates a portion of an optical device having an input waveguide, an optical grating and an odd number of output waveguides.

FIG. 5 illustrates an example of the optical device having an odd number of output waveguides 18. The device includes an input waveguide 10. An input light signal labeled P exits through a port 16 of the input waveguide 10 and is incident on the grating 12 at an incident angle $\theta_i$. The grating 12 is configured to separate the input light signal into five output signals that are each received at one of five output waveguides 18. The five output waveguides 18 include three central waveguides that are each labeled C. The grating axis extends through the center of the centermost central waveguide.

FIG. 5 shows a line extending from the intersection point through the center of the port 20 of the outermost waveguide that closest to the axis. The line has an angle $\theta_o$ relative to the grating axis. The device can be constructed such that $\theta_o$ is less than a limit angle $\theta_L$. Suitable limit angles, $\theta_L$, include angles less than 0.01°, 0.1° or 1°.

As is evident from the above discussions associated with FIG. 4 and FIG. 5, it may be desirable to have a particular wavelength travel away from the grating 12 in a direction that is parallel to the grating axis. For instance, it may be desirable to have the middle wavelength travel away from the grating 12 in a direction that is substantially parallel to the grating axis. The incident angle $\theta_i$ that will produce this result can be approximated from $\sin(\theta_i) = N\lambda/(n_o\Lambda)$ where N is the grating order, $\lambda$ is the wavelength that is desired to be parallel to the grating axis, $n_o$ is the index of refraction for the fundamental mode in the medium through which the light signals are carried, and $\Lambda$ is the grating period.

Figure 6A:
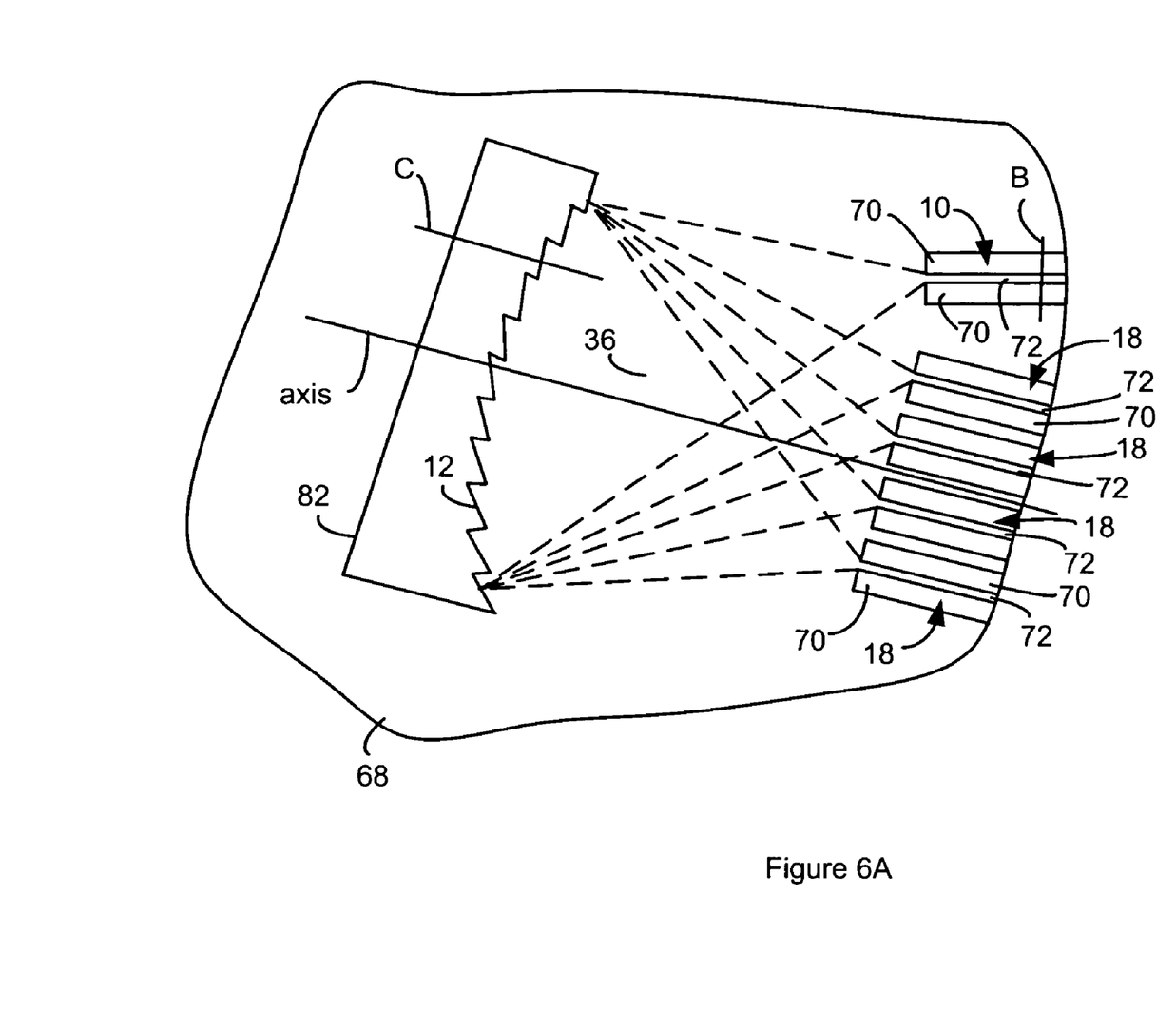
FIG. 6A is a topview of the device.
Figure 6B:
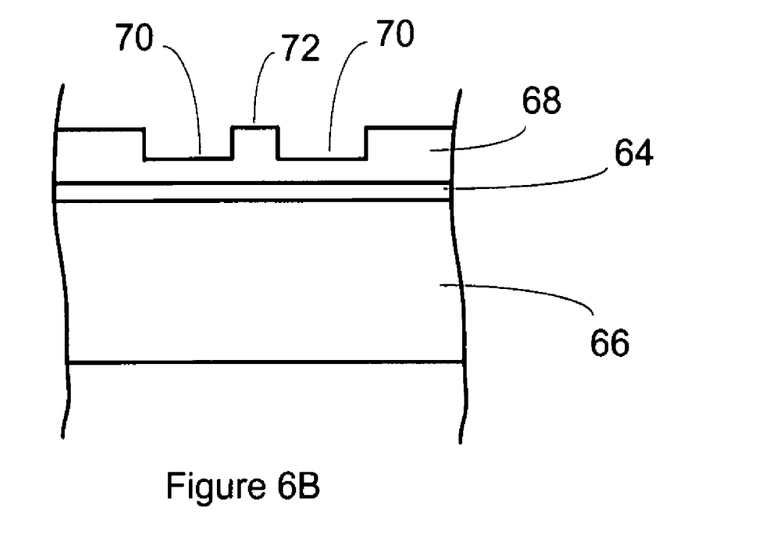
FIG. 6B is a cross section of the device shown in FIG. 6A taken along the line labeled B in FIG. 6A.
Figure 6C:
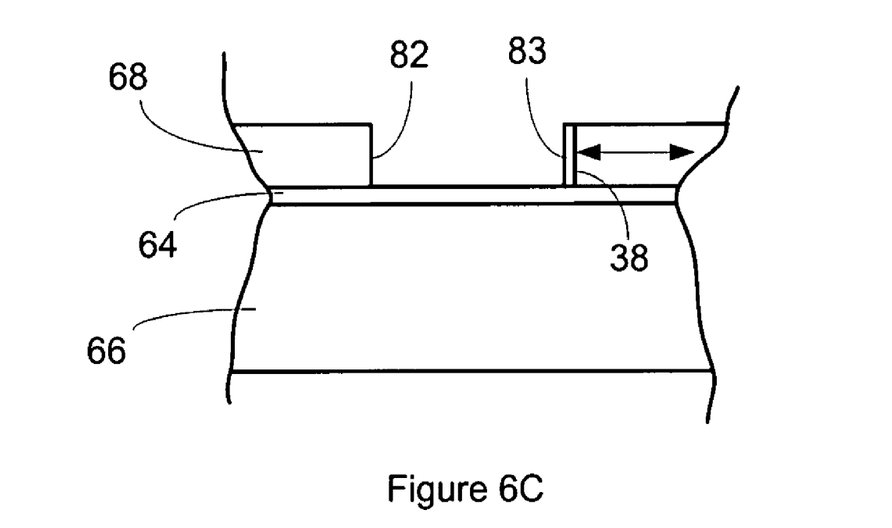
FIG. 6C is a cross-section of the device of the device shown in FIG. 6A taken along the line labeled C in FIG. 6A.

The optical device can be built into a variety of optical component platforms. Suitable optical component platforms include, but are not limited to, a silicon-on-insulator platform. FIG. 6A through FIG. 6C illustrate the device built on a silicon-on-insulator platform. The device includes an input waveguide 10, an echelle grating 12, and a plurality of output waveguides 18 immobilized on a substrate.

FIG. 6A is a topview of the device. FIG. 6B is a cross section of the device shown in FIG. 6A taken along the line labeled B in FIG. 6A. The line labeled B extends through the input waveguide 10 disclosed in FIG. 6A. Accordingly, FIG. 6B is a cross section of the input waveguide 10. The silicon-on-insulator wafer includes a silica layer 64 between a silicon substrate 66 and a silicon slab 68. Trenches 70 in the silicon slab 68 define a ridge 72. The ridge 72 and the silica layer 64 define a light signal-carrying region where the light beam is constrained. For instance, the reduced index of refraction of the silica relative to the silicon prevents the light beam from entering the substrate from the silicon. The output waveguides 18 on the channel device have a structure similar to the structure shown in FIG. 6B although they can have different dimensions or the same dimensions. For instance, the input waveguide 10 and the output waveguides 18 can each have a structure as illustrated in FIG. 3B.

FIG. 6C is a cross-section of the device taken along the line labeled C in FIG. 6A. The line labeled C extends through the echelle grating 12 disclosed in FIG. 6A. Accordingly, FIG. 6C is a cross section of the echelle grating. A reflecting recess 82 extends through the silicon slab 68 to the silica layer 64 and can extend into or through the silica layer 64. A side of the reflecting recess 82 serves as the reflecting surface 38. The side of the reflecting recess 82 can optionally include a reflecting material 83 to enhance reflection of light from the free space region 36. Suitable reflecting materials 83 include a layer of metal. Suitable metals include, but are not limited to, aluminum, copper, gold, and silver. The reflecting recess 82 can be filled with air or can optionally be filled with a cladding material such as silica.

As is evident from a comparison of FIG. 6B and FIG. 6C, the trenches 70 for the waveguides have a different depth than the reflecting recess 82. Accordingly, the trenches 70 can be formed during a different etch than an etch by which the reflecting recess is formed. For instance, the reflecting recess 82 can be masked during etching of the trenches 70 and the trenches 70 can be masked during etching of the reflecting recess. The reflecting material 83 can be formed in the reflecting recess 82 using traditional integrated circuit manufacturing techniques.

Figure 7:
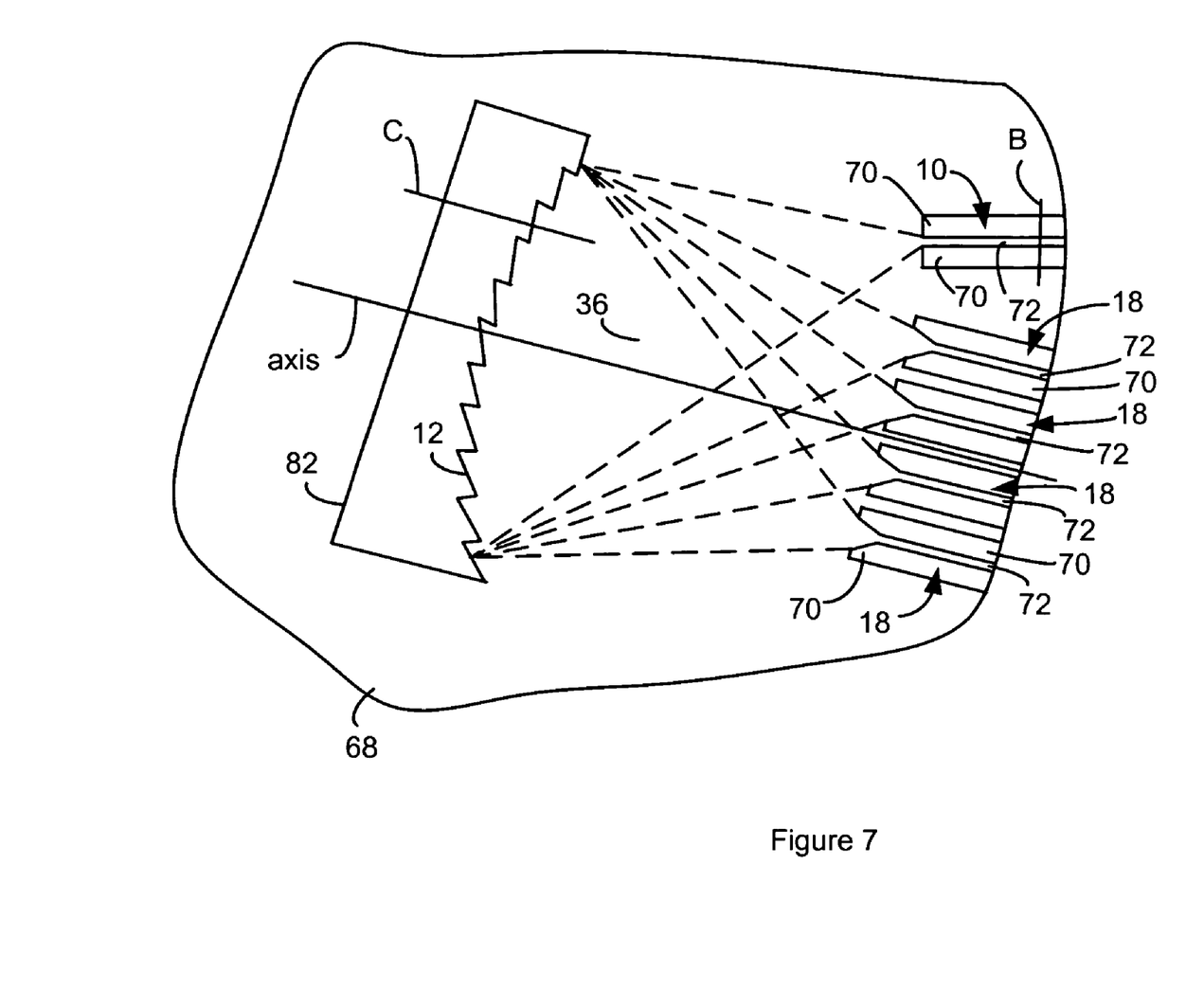
FIG. 7 illustrates the optical device construction of FIG. 6A through FIG. 6C where the output waveguides include tapers.

In some instances, waveguide tapers can be employed to vary the cross-sectional dimensions of the waveguides. For instance, FIG. 7A is a topview of the interface between the echelle grating, the input waveguide 10, and the output waveguides 18 on a silicon-on-insulator wafer. The output waveguides 18 include a horizontal taper 150. The taper 150 can reduce the cross-sectional dimension of the output waveguides 18 to dimensions that are suitable for efficient operation of the modulators. Each taper 150 can have a horizontal taper 150 without a vertical taper, or can have a vertical taper and horizontal taper. Although FIG. 7A illustrates the tapers 150 as having a horizontal taper, the tapers can have vertical taper without horizontal taper. In some instances, the tapers can expand or contract the waveguides from cross-sectional dimensions greater than 50 μm$^2$, or greater than 25 μm$^2$, to less than 25 μm$^2$, or less than 15 μm$^2$, or less than 10 μm$^2$.

Suitable structures for the tapers and methods for fabricating the tapers are provided in U.S. patent application Ser. No. 10/345,709, filed on Jan. 15, 2003, entitled "Controlled Selectivity Etch for Use with Optical Component Fabrication," and incorporated herein in its entirety. The disclosed structures and methods can be employed for the tapers illustrated in FIG. 7A and FIG. 7B.

The device illustrated in FIG. 6A through FIG. 7B can optionally include layers in addition to the illustrated layers. For instance, the device can include a cladding material such as silica and/or layers for making electrical connections.

Although the optical grating is disclosed in the context of demultiplexer operations, the optical grating can be operated in reverse to multiplex signals having different channels into a single signal that includes multiple channels. During multiplexer operation, the grating receives input from the output waveguides and provides output on the input waveguide.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
   an echelle grating and input waveguide arranged such that the echelle grating receives an input signal that exits from a port of the input waveguide,
      the echelle grating having a grating axis and being configured to reflect the input signal such that when the input signal has a plurality of channels, the input signal separates into output signals that each includes a different one of the channels; and
   a plurality of output waveguides that each includes a port positioned to receive one of the output signals,
      the output waveguides including central waveguides,
         the central waveguides being the three centermost output waveguides when the total number of output waveguides is odd and being the two centermost output waveguides when the total number of output waveguides is even, and
         the central waveguides positioned such that the grating axis passes through the port associated with one of the central waveguides or passes between the ports associated with the central waveguides.

2. The device of claim 1, wherein the total number of output waveguides is even and the grating axis extends between the ports associated with the central waveguides.

3. The device of claim 1, wherein the total number of output waveguides is odd and the grating axis extends between the ports associated with the central waveguides.

4. The device of claim 1, wherein the total number of output waveguides is odd and the grating axis extends through the port of the centermost of the central waveguides.

5. The device of claim 1, wherein the grating axis intersects a face of the grating at an intersection point and a line extending from the intersection point through the center of the port of the central waveguide closest to the axis has an angle $\theta_o$ relative to the grating axis,
   $\theta_o$ being less than 0.1°.

6. The device of claim 1, wherein the grating axis intersects a face of the grating at an intersection point and a line extending from the intersection point through the center of the port of the central waveguide closest to the axis has an angle $\theta_o$ relative to the grating axis,
   $\theta_o$ being less than 1°.

7. The device of claim 1, wherein the input waveguide and the echelle grating are immobilized on a substrate.

8. The device of claim 7, wherein the output waveguides are immobilized on the substrate.

9. The device of claim 8, wherein the substrate is a silicon substrate.

10. The device of claim 1, wherein the input waveguide, the echelle grating, and the output waveguides are positioned on a silicon-on-insulator wafer.

11. The optical device of claim 1, wherein
   the channels that are to be received by the output waveguides define a selection of the channels,
      the selection of channels including central channels,
      the central channels being the three centermost channels when the total number of channels is odd and being the two centermost channels when the total number of channels is even; and
   the input waveguide and the echelle grating are arranged such that a central wavelength travels away from the echelle grating in a direction that is parallel to the grating axis,
      the central wavelengths being the wavelengths in a range extending between the wavelengths of the outermost of the central channels.

12. The method of claim 11, wherein the wavelength that travels away from the echelle grating in the direction that is parallel to the grating axis is the wavelength of one of the channels in the selection of channels.

13. The method of claim 11, wherein a middle wavelength is the wavelength that travels away from the echelle grating in the direction that is parallel to the grating axis and the middle wavelength is an average of the wavelengths of the channel with the shortest wavelength and the channel with the longest wavelength.

14. A method of forming an optical device, comprising:
   identifying a selection of optical channels to be included in an input signal and separated from one another;
   providing an optical device having an echelle grating, output waveguides, and an input waveguide arranged such that the echelle grating receives an input signal that exits from a port of the input waveguide,
      the echelle grating having a grating axis and being configured to reflect the input signal such that when the input signal has a plurality of channels, the input signal separates into output signals that each includes a different one of the channels; and
   the output waveguides each including a port positioned to receive one of the output signals,
      the output waveguides including central waveguides,
         the central waveguides being the three centermost output waveguides when the total number of output waveguides is odd and being the two centermost output waveguides when the total number of output waveguides is even, and
         the central waveguides positioned such that the grating axis passes through the port associated with one of the central waveguides or passes between the ports associated with the central waveguides.

15. The method of claim 14, wherein the total number of output waveguides is even and the grating axis extends between the ports associated with the central waveguides.

16. The method of claim 14, wherein the total number of output waveguides is odd and the grating axis extends between the ports associated with the central waveguides.

17. The method of claim 14, wherein the total number of output waveguides is odd and the grating axis extends through the port of the centermost of the central waveguides.

18. The method of claim 14, wherein the grating axis intersects a face of the grating at an intersection point and a line extending from the intersection point through the center of the port of the central waveguide closest to the axis has an angle $\theta_o$ relative to the grating axis,
   $\theta_o$ being less than 0.1°.

19. A method of forming an optical device, comprising:
   identifying central wavelengths in a selection of channels that are to be included in an input signal and separated from one another,
      the selection of channels including central channels, the central channels being the three centermost channels when the total number of channels is odd and being the two centermost channels when the total number of channels is even, and the central wavelengths being the wavelengths in a range extending between the wavelengths of the outermost of the central channels; and generating an optical device having an input waveguide and an echelle arranged such that the echelle grating receives lights signals from the input waveguide and reflects them such that different wavelengths travel away from the echelle grating in different directions, the input waveguide and the echelle grating being arranged such that a wavelength in the central wavelengths travels away from the echelle grating in a direction that is parallel to the grating axis.

20. The method of claim 19, wherein the wavelength that travels away from the echelle grating in the direction that is parallel to the grating axis is the wavelength of one of the channels in the selection of channels.

21. The method of claim 19, wherein a middle wavelength is the wavelength that travels away from the echelle grating in the direction that is parallel to the grating axis and the middle wavelength is an average of the wavelengths of the channel with the shortest wavelength and the channel with the longest wavelength.

* * * * *